United States Patent
Quan et al.

(10) Patent No.: US 10,485,052 B2
(45) Date of Patent: Nov. 19, 2019

(54) DRX IMPLEMENTATION METHOD, DRX CONFIGURATION METHOD, AND RELATED DEVICE

(71) Applicant: Huawei Technologies Co., Ltd., Shenzhen, Guangdong (CN)

(72) Inventors: Wei Quan, Beijing (CN); Jinhua Miao, Shenzhen (CN); Xiaodong Yang, Shenzhen (CN); Jian Zhang, Beijing (CN); Bingzhao Li, Beijing (CN); Zhenxing Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 15/835,877

(22) Filed: Dec. 8, 2017

(65) Prior Publication Data
US 2018/0103504 A1    Apr. 12, 2018

Related U.S. Application Data

(63) Continuation of application No. PCT/CN2015/081252, filed on Jun. 11, 2015.

(51) Int. Cl.
*G08C 17/00* (2006.01)
*H04W 76/28* (2018.01)
(Continued)

(52) U.S. Cl.
CPC .......... *H04W 76/28* (2018.02); *H04W 52/02* (2013.01); *H04W 52/0216* (2013.01);
(Continued)

(58) Field of Classification Search
None
See application file for complete search history.

(56) References Cited

U.S. PATENT DOCUMENTS

2011/0292851 A1  12/2011  Fong et al.
2011/0294491 A1  12/2011  Fong et al.
(Continued)

FOREIGN PATENT DOCUMENTS

CN    101547501 A    9/2009
CN    101567770 A    10/2009
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)"; 3GPP TS 36.331 V12.5.0; Mar. 2015; 445 pages.
(Continued)

*Primary Examiner* — Phirin Sam
(74) *Attorney, Agent, or Firm* — Conley Rose, P.C.

(57) ABSTRACT

Embodiments of the present disclosure disclose a discontinuous reception (DRX) implementation method, a DRX configuration method, and a related device. The DRX implementation method includes: receiving, by a terminal, DRX configuration information sent by a base station, where the terminal supports short transmission time interval (TTI) subframe transmission; and performing DRX according to the DRX configuration information, a system frame number (SFN), and a number of a short TTI subframe, where the short TTI subframe is a subframe numbered according to a short TTI, and a length of the short TTI subframe is less than 1 ms. In the embodiments of the present disclosure, DRX can be implemented at a short TTI, so as to improve overall performance of a system.

20 Claims, 2 Drawing Sheets

(51) Int. Cl.
    *H04W 52/02* (2009.01)
    *H04W 72/04* (2009.01)
    *H04L 1/18* (2006.01)

(52) U.S. Cl.
    CPC ......... *H04W 72/042* (2013.01); *H04L 1/1812* (2013.01); *Y02D 70/1262* (2018.01); *Y02D 70/20* (2018.01); *Y02D 70/21* (2018.01); *Y02D 70/24* (2018.01)

(56) References Cited

U.S. PATENT DOCUMENTS

| | | | |
|---|---|---|---|
| 2012/0207040 A1* | 8/2012 | Comsa | H04W 72/1215 370/252 |
| 2013/0208668 A1 | 8/2013 | Ramos et al. | |
| 2013/0223307 A1* | 8/2013 | Ohlsson | H04W 52/0216 370/311 |
| 2014/0016598 A1* | 1/2014 | Kwon | H04L 5/0023 370/329 |
| 2014/0119198 A1 | 5/2014 | Lee et al. | |
| 2014/0233391 A1 | 8/2014 | Reider et al. | |
| 2015/0271752 A1 | 9/2015 | Lee et al. | |
| 2016/0242229 A1* | 8/2016 | Balachandran | H04W 4/70 |
| 2016/0286604 A1* | 9/2016 | Heo | H04W 52/02 |
| 2017/0026865 A1* | 1/2017 | Behravan | H04W 24/02 |
| 2017/0164363 A1 | 6/2017 | Zhang et al. | |
| 2017/0238272 A1* | 8/2017 | You | H04J 11/0073 370/350 |
| 2018/0124829 A1* | 5/2018 | Lee | H04L 5/00 |
| 2018/0176979 A1* | 6/2018 | Ryu | H04W 8/08 |
| 2018/0242351 A1* | 8/2018 | Dinan | H04W 72/0406 |

FOREIGN PATENT DOCUMENTS

| | | |
|---|---|---|
| CN | 102804904 A | 11/2012 |
| CN | 104468030 A | 3/2015 |
| CN | 104521281 A | 4/2015 |
| JP | 2012530406 A | 11/2012 |
| JP | 2015501623 A | 1/2015 |
| JP | 2017529782 A | 10/2017 |
| WO | 2014189429 A1 | 11/2014 |

OTHER PUBLICATIONS

Ericsson; "Latency reductions in LTE"; 3GPP TSG-RAN WG2 #90; Tdoc R2-152326; Fukuoka, Japan; May 25-29, 2015; 7 pages.
Huawei et al.; "Evaluation on the gains provided by 0.5ms TTI"; 3GPP TSG-RAN WG2 Meeting #90; R2-152456; May 25-29, 2015; 9 pages.
"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.5.0, Mar. 2015, 77 pages.
Foreign Communication From a Counterpart Application, Chinese Application No. 201580080456.6, Chinese Office Action dated May 29, 2019, 7 pages.

\* cited by examiner

DRX IMPLEMENTATION METHOD, DRX CONFIGURATION METHOD, AND RELATED DEVICE

CROSS REFERENCE TO RELATED APPLICATIONS

This application is a continuation of International Application No. PCT/CN2015/081252, filed on Jun. 11, 2015, which is hereby incorporated by reference in its entirety.

TECHNICAL FIELD

Embodiments of the present application relate to the field of communications technologies, and in particular, to a discontinuous reception (DRX) implementation method, a discontinuous reception configuration method, and a related device.

BACKGROUND

In a Long Term Evolution (LTE) system, architecture, a standard transmission time interval (TTI) is 1 ms. A TTI is a length of independent decoding transmission on a radio link. As people have more requirements for mobile data services, increasing data services require a short delay. Therefore, a concept of a short TTI is introduced. According to research and analysis, when a short TTI (for example, a 0.5 ms TTI) is used, a processing delay between a terminal and a base station can be reduced, and a throughput of a network and that of the terminal can be increased. Using a short TTI means that the base station or the terminal uses a relatively small (less than 1 ms) time unit to transmit data.

In an LTE system, a base station is responsible for controlling uplink and downlink data transmission. When the base station determines to schedule a terminal, the base station notifies, by using a physical downlink control channel (PDCCH), the terminal of a resource on which data is sent or received. The terminal listens to a downlink control channel, and completes data sending (uplink) or receiving (downlink) according to an instruction of the downlink control channel if scheduling information of the terminal is included. In an active state, because the terminal does not know a time at which the base station schedules the terminal, a common working mode is as follows: The terminal continuously listens to the downlink control channel, and parses each subframe that includes the downlink control channel, to determine whether the terminal is scheduled. In this working manner, it is more efficient when the terminal relates to a larger data volume, and the terminal may be frequently scheduled. However, for some services, because data arrives at relatively low frequency, the terminal is scheduled for a smaller quantity of times. In this case, if the terminal still continuously listens to the downlink control channel, power consumption of the terminal undoubtedly increases. To resolve a power consumption problem, a DRX working mode is used in the LTE system. In this working mode, the terminal periodically listens to the downlink control channel, so as to save power.

In the prior art, only a solution of implementing DRX when a TTI is a standard TTI (that is, the TTI is 1 ms) is provided, but a solution of implementing DRX when the TTI is shortened is not provided.

SUMMARY

In view of this, embodiments of the present disclosure provide a DRX implementation method, a DRX configuration method, and a related device, so as to implement DRX at a short TTI, and improve overall performance of a system.

According to a first aspect, an embodiment of the present disclosure provides a terminal, including:

a receiving unit, configured to receive discontinuous reception DRX configuration information sent by a base station, where the terminal supports short transmission time interval TTI subframe transmission; and a processing unit, configured to perform DRX according to the DRX configuration information, a system frame number SFN, and a frame number of the short TTI subframe, where the short TTI subframe is a subframe numbered according to a short TTI, and a length of the short TTI subframe is less than 1 ms.

With reference to the first aspect, in a first implementation of the first aspect, the terminal further includes:

a sending unit, configured to send a capability notification message to the base station before the receiving unit receives the DRX configuration information sent by the base station, where the capability notification message is used to notify the base station that the terminal supports the short TTI subframe transmission.

With reference to the first aspect, in a second implementation of the first aspect, the DRX configuration information includes:

a timing length of a DRX-related timer, a short DRX cycle length, a long DRX cycle length, and a DRX start offset drxStartOffset.

With reference to the second implementation of the first aspect, in a third implementation of the first aspect, the DRX-related timer includes:

an on-duration timer onDurationTimer, a DRX inactivity timer drx-InactivityTimer, a DRX retransmission timer drx-RetransmissionTimer, and a hybrid automatic repeat request round trip time timer HARQ RTT Timer.

With reference to the third implementation of the first aspect, in a fourth implementation of the first aspect, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information all use a length of the long TTI subframe as a parameter.

With reference to the third implementation of the first aspect, in a fifth implementation of the first aspect, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

With reference to the fourth or the fifth implementation of the first aspect, in a sixth implementation of the first aspect, the length of the long TTI subframe is 1 ms, and the long TTI subframe is a subframe numbered according to the long TTI.

According to a second aspect, an embodiment of the present disclosure provides a base station, including:

a determining unit, configured to determine that a terminal supports short transmission time interval TTI subframe transmission, where the snort TTI subframe is a subframe numbered according to a short TTI, and a length of the short TTI subframe is less than 1 ms; and a sending unit, configured to deliver DRX configuration information to the terminal according to the short TTI subframe transmission supported by the terminal.

With reference to the second aspect, in a first implementation of the second aspect, the base station further includes:

a receiving unit, configured to: before the determining unit determines that the terminal supports the short TTI subframe transmission, receive a capability notification message sent by the terminal, where the capability notification message is used to notify the base station that the terminal supports the short TTI subframe transmission.

With reference to the second aspect, in a second implementation of the second aspect, the DRX configuration information includes:

a timing length of a DRX-related timer, a short DRX cycle length, a long DRX cycle length, and a DRX start offset drxStartOffset.

With reference to the second implementation of the second aspect, in a third implementation of the second aspect, the DRX-related timer includes:

an on-duration timer onDurationTimer, a DRX inactivity timer drx-InactivityTimer, a DRX retransmission timer drx-RetransmissionTimer, and a hybrid automatic repeat request round trip time timer HARQ RTT Timer.

With reference to the third implementation of the second aspect, in a fourth implementation of the second aspect, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information all use a length of the long TTI subframe as a parameter.

With reference to the third implementation of the second aspect, in a fifth implementation of the second aspect, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

With reference to the fourth or the fifth implementation of the second aspect, in a sixth implementation of the second aspect, the length of the long TTI subframe is 1 ms, and the long TTI subframe is a subframe numbered according to the long TTI.

According to a third aspect, an embodiment of the present disclosure provides a discontinuous reception DRX implementation method, including:

receiving, by a terminal, DRX configuration information sent by a base station, where the terminal supports short transmission time interval TTI subframe transmission; and performing DRX according to the DRX configuration information, a system frame number SFN, and a frame number of the short TTI subframe, where the short TTI subframe is a subframe numbered according to a short TTI, and a length of the short TTI subframe is less than 1 ms.

With reference to the third aspect, in a first implementation of the third aspect, before the receiving DRX configuration information sent by a base station, the method further includes:

sending a capability notification message to the base station, where the capability notification message is used to notify the base station that the terminal supports the snort TTI subframe transmission.

With reference to the third aspect, in a second implementation of the third aspect, the DRX configuration information includes:

a timing length of a DRX-related timer, a short DRX cycle length, a long DRX cycle length, and a DRX start offset drxStartOffset.

With reference to the second implementation of the third aspect, in a third implementation of the third aspect, the DRX-related timer includes:

an on-duration timer onDurationTimer, a DRX inactivity timer drx-InactivityTimer, a DRX retransmission timer drx-RetransmissionTimer, and a hybrid automatic repeat request round trip time timer HARQ RTT Timer.

With reference to the third implementation of the third aspect, in a fourth implementation of the third aspect, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information all use a length of the long TTI subframe as a parameter.

With reference to the third implementation of the third aspect, in a fifth implementation of the third aspect, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

With reference to the fourth or the fifth implementation of the third aspect, in a sixth implementation of the third aspect, the length of the long TTI subframe is 1 ms, and the long TTI subframe is a subframe numbered according to the long TTI.

According to a fourth aspect, an embodiment of the present disclosure provides a discontinuous reception DRX configuration method, including:

determining, by a base station, that a terminal supports short transmission time interval TTI subframe transmission, where the short TTI subframe is a subframe numbered according to a short TTI, and a length of the short TTI subframe is less than 1 ms; and delivering DRX configuration information to the terminal according to the short TTI subframe transmission supported by the terminal.

With reference to the fourth aspect, in a first implementation of the fourth aspect, before the determining that a terminal supports short TTI subframe transmission, the method further includes:

receiving a capability notification message sent by the terminal, where the capability notification message is used to notify the base station that the terminal supports the short TTI subframe transmission.

With reference to the fourth aspect, in a second implementation of the fourth aspect, the DRX configuration information includes:

a timing length of a DRX-related timer, a short DRX cycle length, a long DRX cycle length, and a DRX start offset drxStartOffset.

With reference to the second implementation of the fourth aspect, in a third implementation of the fourth aspect, the DRX-related timer includes:

an on-duration timer onDurationTimer, a DRX inactivity timer drx-InactivityTimer, a DRX retransmission timer drx-RetransmissionTimer, and a hybrid automatic repeat request round trip time timer HARQ RTT Timer.

With reference to the third implementation of the fourth aspect, in a fourth implementation of the fourth aspect, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of the long TTI subframe as a parameter; or a timing length of the on-duration timer, a timing length of the DRX inactivity timer, and a timing length of the DRX retransmission timer that are in the DRX configuration information all use a length of the long TTI subframe as a parameter.

With reference to the third implementation of the fourth aspect, in a fifth implementation of the fourth aspect, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

With reference to the fourth or the fifth implementation of the fourth aspect, in a sixth implementation of the fourth aspect, the length of the long TTI subframe is 1 ms, and the long TTI subframe is a subframe numbered according to the long TTI.

According to a fifth aspect, an embodiment of the present disclosure provides a terminal, including: a first memory, a first processor, and a first transceiver, where the first processor invokes a software program stored in the first memory to implement the following functions:

controlling the first transceiver to receive DRX configuration information sent by a base station; and performing DRX according to the DRX configuration information, a system frame number SFN, and a frame number of a short TTI subframe, where the short TTI subframe is a subframe numbered according to a short TTI, and a length of the snort TTI subframe is less than 1 ms.

With reference to the fifth aspect, in a first implementation of the fifth aspect, the first processor is further configured to:

before controlling the first transceiver to receive the DRX configuration information sent by the base station, control the first transceiver to send a capability notification message to the base station, where the capability notification message is used to notify the base station that the terminal supports snort TTI subframe transmission.

With reference to the fifth aspect, in a second implementation of the fifth aspect, the DRX configuration information includes:

a timing length of a DRX-related timer, a short DRX cycle length, a long DRX cycle length, and a DRX start offset drxStartOffset.

With reference to the second implementation of the fifth aspect, in a third implementation of the fifth aspect, the DRX-related timer includes:

an on-duration timer onDurationTimer, a DRX inactivity timer drx-InactivityTimer, a DRX retransmission timer drx-RetransmissionTimer, and a hybrid automatic repeat request round trip time timer HARQ RTT Timer.

With reference to the third implementation of the fifth aspect, in a fourth implementation of the fifth aspect, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information all use a length of a long TTI subframe as a parameter.

With reference to the third implementation of the fifth aspect, in a fifth implementation of the fifth aspect, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

With reference to the fourth or the fifth implementation of the fifth aspect, in a sixth implementation of the fifth aspect, the length of the long TTI subframe is 1 ms, and the long TTI subframe is a subframe numbered according to the long TTI.

According to a sixth aspect, an embodiment of the present disclosure provides a base station, including: a second memory, a second processor, and a second transceiver, where the second processor invokes a software program stored in the second memory to implement the following functions:

determining that a terminal supports short TTI subframe transmission, where a short TTI subframe is a subframe numbered according to a short TTI, and a length of the short TTI subframe is less than 1 ms; and controlling the second transceiver to deliver DRX configuration information to the terminal according to the short TTI subframe transmission supported by the terminal.

With reference to the sixth aspect, in a first implementation of the sixth aspect, before determining that the terminal supports short TTI subframe transmission, the second processor controls the second transceiver to receive a capability notification message sent by the terminal, where the capability notification message is used to notify the base station that the terminal supports the short TTI subframe transmission.

With reference to the sixth aspect, in a second implementation of the sixth aspect, the DRX configuration information includes:

a timing length of a DRX-related timer, a short DRX cycle length, a long DRX cycle length, and a DRX start offset drxStartOffset.

With reference to the second implementation of the sixth aspect, in a third implementation of the sixth aspect, the DRX-related timer includes:

an on-duration timer onDurationTimer, a DRX inactivity timer drx-InactivityTimer, a DRX retransmission timer drx-RetransmissionTimer, and a hybrid automatic repeat request round trip time timer HARQ RTT Timer.

With reference to the third implementation of the sixth aspect, in a fourth implementation of the sixth aspect, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information all use a length of the long TTI subframe as a parameter.

With reference to the third implementation of the sixth aspect, in a fifth implementation of the sixth aspect, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

With reference to the fourth or the fifth implementation of the sixth aspect, in a sixth implementation of the sixth aspect, the length of the long TTI subframe is 1 ms, and the long TTI subframe is a subframe numbered according to the long TTI.

It can be seen from the foregoing technical solutions that the embodiments of the present disclosure have the following advantages:

In the embodiments of the present disclosure, a base station delivers DRX configuration information to a terminal according to short TTI subframe transmission supported by the terminal. A receiving unit of the terminal receives the DRX configuration information delivered by the base station. A processing unit performs DRX according to the DRX configuration information delivered by the base station, a system frame number, and a frame number of a short TTI subframe. The short TTI subframe is a subframe numbered according to a short TTI, and a length of the short TTI subframe is less than 1 ms, while a length of a current standard TTI subframe is 1 ms. Therefore, the embodiments of the present disclosure provide a solution of implementing DRX when a TTI is shortened, so as to improve overall performance of a system.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

When a short TTI (a TTI less than 1 ms) is used, a processing delay between a terminal and a base station can be reduced, and a throughput of a network and that of the terminal can be increased. In the prior art, a solution of implementing DRX when a TTI is shortened is not provided. Therefore, the embodiments of the present disclosure provide a DRX implementation method, a DRX configuration method, and a related device, so as to implement DRX at a snort TTI. In this way, a processing delay between a terminal and a base station is reduced, a throughput of a network and that of the terminal are increased, and overall performance of a system is improved.

Figure 1:
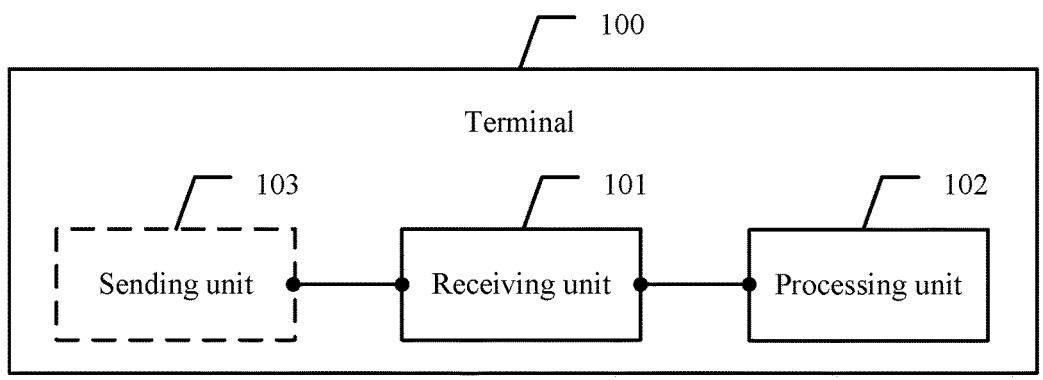
FIG. 1 is a schematic diagram of a terminal according to an embodiment of the present disclosure.

Referring to FIG. 1, a terminal in an embodiment of the present disclosure includes:

a receiving unit 101, configured to receive DRX configuration information sent by a base station, where the terminal supports short TTI subframe transmission; and a processing unit 102, configured to perform DRX according to the DRX configuration information, a system frame number (SFN), and a frame number of a short TTI subframe, where the short TTI subframe is a subframe numbered according to a short TTI, and a length of the short TTI subframe is less than 1 ms.

In addition, the terminal in this embodiment may further include:

a sending unit 103, configured to send a capability notification message to the base station before the receiving unit 101 receives the DRX configuration information sent by the base station, where the capability notification message is used to notify the base station that the terminal supports the short TTI subframe transmission.

In specific implementation, when the terminal accesses a network, the sending unit 103 may send the capability notification message to the base station, and the base station determines, according to the notification message, that the terminal supports short TTI subframe transmission. Alternatively, the base station determines, according to pre-stored information related to the terminal, that the terminal supports short TTI subframe transmission. A value of the length of the short TTI subframe may fall within 0 ms to 1 ms, for example, 0.5 ms or 0.8 ms. After determining that the terminal supports short TTI subframe transmission, the base station delivers the DRX configuration information to the terminal according to short TTI subframe transmission supported by the terminal and by using radio resource control (RRC) signaling, and the receiving unit 101 receives the DRX configuration information delivered by the base station.

The DRX configuration information includes a timing length of an on-duration timer (onDurationTimer), a timing length of a DRX inactivity timer (drx-InactivityTimer), a timing length of a DRX retransmission timer (drx-RetransmissionTimer), a timing length of a hybrid automatic repeat request round trip time timer (HARQ RTT Timer), a short DRX cycle length, a long DRX cycle length, and a DRX start offset (drxStartOffset).

Both the short DRX cycle length and the long DRX cycle length use the length of the short TTI subframe as a parameter. Specific values of the cycle lengths are correspondingly the same as specific values of the short DRX cycle length and the long DRX cycle length when the short DRX cycle length and the long DRX cycle length use a length of a long TTI subframe as a parameter. The DRX start offset (drxStartOffset) is counted by using the short TTI subframe as a parameter.

The length of the long TTI subframe may be an existing standard TTI length, that is, the length of the long TTI subframe is 1 ms. Certainly, the length of the long TTI subframe may be another value less than 1 ms, and the length of the short TTI subframe is less than the length of the long TTI subframe.

In addition, a timing length of the on-duration timer, a timing length of the DRX inactivity timer, and a timing length of the DRX retransmission timer all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer still use a length of a long TTI subframe as a parameter, and the timing lengths do not change.

For example, either the long TTI or the short TTI is used, the timing length of the on-duration timer is 10 ms. Assuming that the length of the short TTI subframe is 0.5 ms, if the length of the short TTI subframe is used as a parameter, the timing length that is of the on-duration timer and that is configured in the RRC signaling is lengths of 20 short TTI subframes; or if the length of the long TTI subframe is used as a parameter, the timing length that is of the on-duration timer and that is configured in the RRC signaling is lengths of ten long TTI subframes.

The timing length of the hybrid automatic repeat request round trip time timer also uses the length of the short TTI subframe as a parameter. A quantity of snort TTI subframes that are included in the hybrid automatic repeat request round trip time timer at the short TTI is the same as a quantity of long TTI subframes that are included in the hybrid automatic repeat request round trip time timer at the long TTI. That is, the timing length of the hybrid automatic repeat request round trip time timer changes in the two cases. For example, the length of the short TTI subframe is 0.5 ms, the timing length of the hybrid automatic repeat request round trip time timer is lengths of eight long TTI subframes (that is, 8 ms) at the long TTI, and the timing length of the hybrid automatic repeat request round trip time timer is lengths of eight short TTI subframes (that is, 4 ms) at the short TTI.

On the terminal side, the snort TTI subframe is numbered according to the short TTI, and the length of the short TTI subframe is the same as the length of the short TTI, for example, 0.5 ms. After the receiving unit 101 receives the DRX configuration information delivered by the base station, the processing unit 102 performs DRX according to the DRX configuration information.

Specifically, a process in which the processing unit 102 performs DRX may be as follows:

When the short DRX cycle is used, if the frame number of the short TTI subframe (shortenSubframe) meets the following condition:

[(SFN*10)+Frame number of a short TTI subframe] mod (Short DRX cycle length)=(drxStartOffset) mod (Short DRX cycle length), the on-duration timer is enabled, and listening to a PDCCH starts. Herein, SFN is a system frame number, and the system frame number may be determined by the terminal according to a broadcast message and a blind detection result that are sent by the base station; and drxStartOffset is a DRX start offset, that is, a short TTI subframe in which the on-duration timer is enabled in DRX.

When the long DRX cycle is used, if the frame number of the short TTI subframe meets the following condition:

[(SFN*10)+Frame number of a short TTI subframe] mod (Long DRX cycle length)=drxStartOffset, the on-duration timer is enabled, and listening to a PDCCH starts.

In addition, when the frame number of the short TTI subframe meets the foregoing condition, and a moment is exactly an integer moment, the on-duration timer may be enabled, and listening to the PDCCH starts, so as to facilitate data collection of the terminal. For example, when the length of the short TTI subframe is 0.5 ms, the on-duration timer may be enabled when the frame number of the short TTI subframe meets the foregoing condition and the frame number is an even number. In this way, a start moment of the listening is exactly an integer moment (for example, at 1 ms or 2 ms).

When the on-duration timer is enabled, and the PDCCH is listened to, if the terminal receives control signaling for HARQ initial transmission, the DRX inactivity timer is enabled to delay a listening time. In addition, the HARQ RTT timer is enabled. Therefore, the terminal may not listen to the PDCCH before next retransmission. That is, the terminal does not listen to the PDCCH after the DRX inactivity timer expires and before the HARQ RTT timer expires. If data in a corresponding HARQ procedure is not successfully decoded after previous HARQ transmission (for example, the terminal feeds back a negative acknowledgement NACK), after the HARQ RTT timer expires, the terminal enables the DRX retransmission timer, and continues to listen to the PDCCH.

It can be learned from, the foregoing process that the terminal listens to the PDCCH as long as any one of the on-duration timer, the DRX inactivity timer, or the DRX retransmission timer is enabled to run.

In this embodiment, a base station delivers DRX configuration information to a terminal according to short TTI subframe transmission supported by the terminal. A receiving unit of the terminal receives the DRX configuration information delivered by the base station. A processing unit performs DRX according to the DRX configuration information delivered by the base station, a system frame number, and a number of a short TTI subframe. The short TTI subframe is a subframe numbered according to a short TTI, and a length of the short TTI subframe is less than 1 ms, while a length of an existing standard TTI subframe is 1 ms. Therefore, this embodiment provides a solution of implementing DRX when a TTI is shortened, so as to improve overall performance of a system.

The foregoing embodiment describes a scenario of applying a short TTI to DRX. In actual application, the short TTI may be further applied to another scenario. For ease of description, duration of a snort TTI mentioned below is half duration of a long TTI by default, that is, 0.5 ms. Specific application scenarios are as follows:

In a first application scenario, the short TTI may be applied to a semi-persistent scheduling (Semi-Persistent Scheduling, SPS) scenario. At the long TTI, for downlink data, when a frame number of a subframe meets the following formula, resource allocation corresponding to SPS may be obtained in the subframe, and corresponding SPS transmission is activated:

(10*SFN+Frame number of a long TTI subframe)= [(10*SFNstart time+Subframestart time)+ N*SemiPersistSchedIntervalDL]modulo 10240.

Herein, SFN is a system frame number, N is a quantity of cycles in which the configured semi-persistent scheduling can be maintained, semiPersistSchedIntervalDL is a downlink cycle length of the semi-persistent scheduling, that is, frequency at which a semi-persistently scheduled resource occurs, and SFNstart time and Subframestart time are a system frame number and a subframe number of the PDCCH that are received by the terminal and that indicate uplink/downlink SPS activation.

For uplink data, when a frame number of a subframe meets the following formula, resource allocation corresponding to SPS may be obtained in the subframe, and corresponding SPS transmission is activated:

(10*SFN+Frame number of a long TTI subframe)= [(10*SFNstart time+Subframestart time)+ N*SemiPersistSchedIntervalUL+Subframe_Offset*(N modulo 2)] modulo 10240. Herein, semiPersistSchedIntervalUL is an uplink cycle length of the semi-persistent scheduling, and Subframe_Offset is a subframe offset.

At the long TTI, there are totally 10240 long TTI subframes in an SFN cycle. At the short TTI, the length of the short TTI subframe is half the length of the long TTI subframe. Therefore, to keep an entire SFN cycle length unchanged, 20480 short TTI subframes need to be included. Likewise, an SFN originally includes ten long TTI subframes. When the short TTI subframe is used, to keep an SFN length unchanged, an SFN needs to include 20 short TTI subframes.

Correspondingly, after the short TTI subframe is used, formulas for determining uplink and downlink locations at which the resource allocation corresponding to the SPS is obtained, and the corresponding SPS transmission is activated may be as follows:

in downlink: (20*SFN+Frame number of a short TTI subframe)=[(20*SFNstart time+Subframestart time)+ N*SemiPersistSchedIntervalDL] modulo 20480; and in uplink: (20*SFN+Frame number of a short TTI subframe)=[(20*SFNstart time+Subframestart time)+ N*SemiPersistSchedIntervalUL+Subframe_Offset*(N modulo 2)] modulo 20480.

In a second application scenario, in some scenarios in which a subframe is used for counting, if the short TTI subframe is used for counting, a quantity of corresponding subframes needs to be correspondingly expanded. For example, for subframe counting of two timers of a periodicBSR-Timer and a retxBSR-Timer in a buffer status report (BSR), and for subframe counting of a physical (PHY) layer, a Medium. Access Control (MAC) layer, an RRC layer, and the like, a quantity of subframes needs to be correspondingly expanded.

Specifically, for example, in a process in which the terminal performs random access, if the short TTI subframe is used, a quantity of corresponding subframes needs to be correspondingly expanded. In this process, the terminal first sends, to the base station by using a random access channel (RACE), a message 1 (Msg1) that carries a preamble sequence. After receiving the Msg1 sent by UE, the base station returns a message 2 (Msg2) to the terminal. A radio network temporary identifier (Radio Network Temporary Identifier, RNTI) needs to be used as an index in a process in which the terminal receives the Msg2. An RNTI calculation manner is as follows:

RA-RNTI=1+$t\_id$+10*$f\_id$.

Herein, t_id represents a number of the first subframe at a moment at which the Msg1 that carries the preamble sequence is sent, and f_id represents a number in a frequency domain. Because t_id is a subframe number, if the short TTI is used, a number range needs to be correspondingly expanded. For example, an original number range is 0≤t_id<10, and a current range should be 0≤t_id<20.

In addition, the terminal receives the Msg2 within a time window. This time window starts from the third subframe following a subframe in which the terminal sends the Msg1, and has a length of ra-ResponseWindowSize. If the short TTI subframe is used for counting, a quantity of subframes that is used to represent the length of this time window needs to be doubled.

For contention-based random access, after receiving the Msg2, the terminal further needs to send a message 3 (Msg3) to the base station. Only after the terminal receives a message 4 (Msg4) returned by the base station, it is considered that the terminal successfully accesses the network. After the terminal sends the Msg3, in a process in which the terminal waits to receive the Msg4, a MAC contention resolution timer needs to be used. If the short TTI subframe is used, a quantity of subframes that is used to represent a timing length of this timer needs to be doubled.

In a third application scenario, if the short TTI is used and an SFN length keeps unchanged, subframe counting in an SFN needs to be expanded. In this way, two mechanisms of broadcasting the SFN are required on the base station side, so that a terminal that supports the short TTI can be compatible with a terminal that supports the long TTI. In another manner, there is only a terminal that supports the short TTI. In this case, the base station requires only one mechanism of broadcasting the SFN.

In a fourth application scenario, this embodiment provides another solution of implementing DRX at a short TTI. In this embodiment, a short TTI subframe in which a PDCCH is listened to in downlink is defined at the short TTI, that is, a shortenPdcchSubframe. The shortenPdcchSubframe is also numbered according to the short TTI, but the short TTI subframe can only be a downlink subframe.

When the short DRX cycle is used, if a frame number of the shortenPdcchSubframe meets the following condition:

[(SFN*10)+Frame number of a shortenPdcchSubframe] mod (Short DRX cycle length)=(drxStartOffset) mod (Short DRX cycle length), the on-duration timer is enabled, and listening to a PDCCH starts.

When the long DRX cycle is used, if a frame number of the shortenPdcchSubframe meets the following condition:

[(SFN*10)+Frame number of a shortenPdcchSubframe] mod (Long DRX cycle length)=drxStartOffset, the on-duration timer is enabled, and listening to a PDCCH starts.

A subsequent processing process is the same as a process of implementing DRX at the short TTI by using the shortenSubframe in the foregoing embodiment. Details are not described herein again.

In a fifth application scenario, the short TTI may be applied to a Multimedia Broadcast Multicast Service (MBMS) scenario. A specific process may be as follows:

Step 1: The base station sends a preconfigured short TTI MBMS resource to the terminal by using RRC signaling, where the preconfigured short TTI MBMS resource includes a physical layer control channel resource and a physical layer data channel resource, and these resources may be based on time division or frequency division.

It should be rioted that, if both the terminal and the base station learn of the preconfigured short TTI MBMS resource, step 1 is not required, and step 2 is directly performed.

Step 2: The base station configures the terminal that accesses a network, so that the terminal works in a short TTI working mode.

Step 3: The base station configures the terminal, so that the terminal performs an MBMS service.

Step 4: The base station sends MBMS data to the terminal in a short TTI working manner.

In a specific short TTI working mode, the short TTI subframe and the like may be used, that is, a relatively short TTI subframe is used when an MBMS service is transmitted.

In a sixth application scenario, the short TTI may be applied to a device-to-device (D2D) scenario. In an existing D2D communications technology, a long TTI (that is, a 1 ms TTI) is used for communication. To shorten a delay, a short TTI may be used for communication in the D2D scenario. When the short TTI is used for communication, how the terminal learns of a short TTI capability of another D2D terminal is a problem that needs to be urgently resolved. This embodiment provides a detailed solution that may be as follows:

Step 1: The base station sends a preconfigured D2D resource pool to a terminal 1 by using RRC signaling. The preconfigured D2D resource pool includes a physical layer control channel resource pool and a physical layer data channel resource pool. The terminal may perform, a communication process or a discovery process by using the resource pool.

It should be noted that, if both the terminal and the base station learn of the preconfigured D2D resource pool, step 1 is not required, and step 2 is directly performed.

Step 2: The base station configures the terminal 1 that accesses a network, so that the terminal works in a short TTI working mode.

Step 3: The terminal 1 obtains short TTI capability information of a terminal 2 (or another D2D terminal), for example, whether the terminal 2 supports a short TTI working manner, or short TTI configuration information of the terminal 2 (for example, time-frequency resource locations of a control channel and a data channel).

Optionally, a manner for obtaining the short TTI capability information of the terminal 2 may include: The terminal 1 obtains the short TTI capability information of the terminal 2 according to RRC signaling sent by the base station; the terminal 1 obtains the short TTI capability information of the terminal 2 from a core network; the terminal 1 obtains the short TTI capability information of the terminal 2 by using a multicast message of the terminal 2; or the terminal 1 sends, to another D2D terminal, a request for detecting a capability of the terminal 2, and the terminal 1 learns of a short TTI capability of the terminal 2 according to a feedback result from the another terminal.

Step 4: The terminal 1 sends D2D data to the terminal 2 in the short TTI working manner. Optionally, the terminal 2 may learn in advance that a working mode of the terminal 1 is a short TTI, so that the terminal 2 performs data reception or data feedback according to a TTI length of the terminal 1. A specific manner in which the terminal 2 learns of the working mode of the terminal 1 may include: The terminal 2 learns of the working mode of the terminal 1 according to RRC signaling sent by the base station to the terminal 2; the terminal 2 learns of the working mode of the terminal 1 from a core network; the terminal 2 learns of the working mode of the terminal 1 by reading a multicast message sent by the terminal 1; or the terminal 2 directly sends a working mode learning request to the terminal 1, and learns of the working mode of the terminal 1 according to feedback information of the terminal 1, short TTI use control information added into control information by the terminal 1, or the like. In a specific short TTI working manner, a new subframe length may be used for data reception and sending; a control channel uses a short TTI, and a data channel uses a long TTI; a control channel uses a long TTI, and a data channel uses a short TTI; or different. TTI lengths are used in sending and reception processes.

Figure 2:
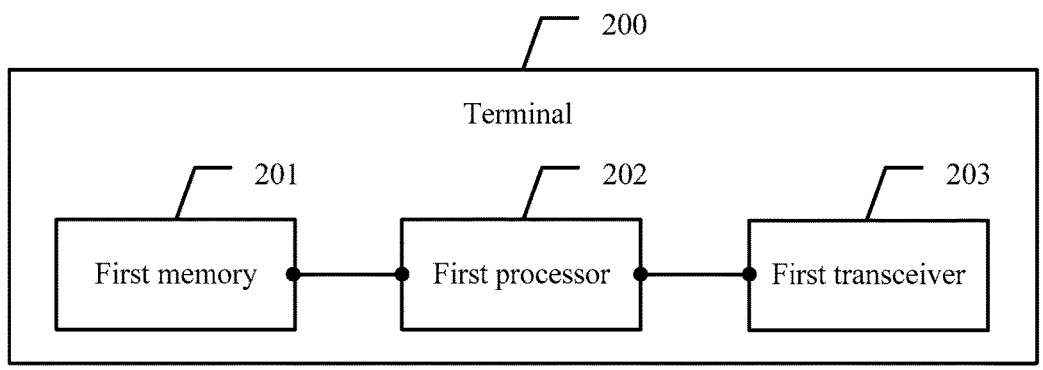
FIG. 2 is a schematic diagram, of a terminal according to another embodiment of the present disclosure.

Referring to FIG. 2, a terminal in another embodiment of the present disclosure includes: a first, memory 201, a first processor 202, and a first transceiver 203. The first processor 202 invokes a software program stored in the first memory 201 to implement the following functions:

controlling the first transceiver 203 to receive DRX configuration information sent by a base station; and performing DRX according to the DRX configuration information, a system frame number SFN, and a frame number of a short TTI subframe, where the short TTI subframe is a subframe numbered according to a short TTI, and a length of the short TTI subframe is less than 1 ms.

Optionally, the first processor 202 is further configured to: before controlling the first transceiver 203 to receive the DRX configuration information sent by the base station, control the first transceiver 203 to send a capability notification message to the base station, where the capability notification message is used to notify the base station that the terminal supports short TTI subframe transmission.

Optionally, the DRX configuration information includes: a timing length of a DRX-related timer, a short DRX cycle length, a long DRX cycle length, and a DRX start offset (drxStartOffset).

Optionally, the DRX-related timer includes:

an on-duration timer (onDurationTimer), a DRX inactivity timer (drx-InactivityTimer), a DRX retransmission timer (drx-RetransmissionTimer), and a hybrid automatic repeat request round trip time timer (HARQ RTT Timer).

Optionally, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information ail use a length of a long TTI subframe as a parameter.

Optionally, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

Optionally, the length of the long TTI subframe is 1 ms, and the long TTI subframe is a subframe numbered according to the long TTI.

Figure 3:
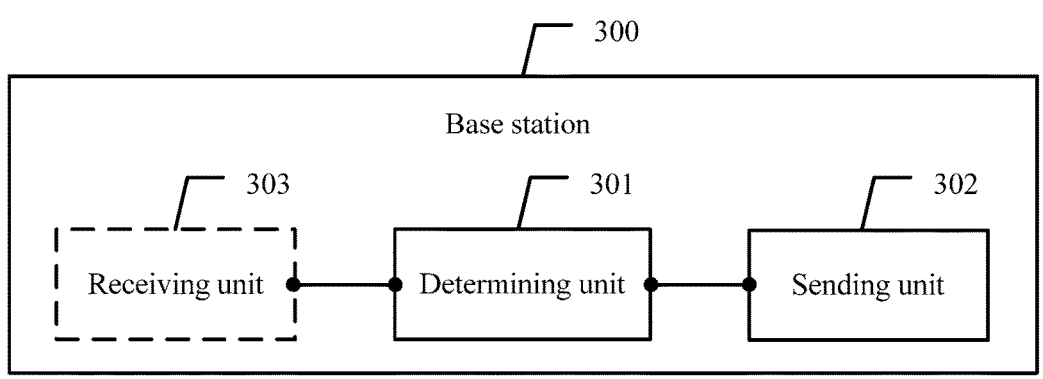
FIG. 3 is a schematic diagram of a base station according to an embodiment of the present disclosure.

The following describes a base station according to an embodiment of the present disclosure. Referring to FIG. 3, the base station in this embodiment includes:

a determining unit 301, configured to determine that a terminal supports short TTI subframe transmission, where a short TTI subframe is a subframe numbered according to a short TTI, and a length of the short TTI subframe is less than 1 ms; and a sending unit 302, configured to deliver DRX configuration information to the terminal according to the short TTI subframe transmission supported by the terminal.

In addition, the base station in this embodiment may further include:

a receiving unit 303, configured to: before the determining unit 301 determines that the terminal supports the short TTI subframe transmission, receive a capability notification message sent by the terminal, where the capability notification message is used to notify the base station that the terminal supports the short TTI subframe transmission.

In specific implementation, when the terminal accesses a network, the terminal may send the capability notification message to the base station. The receiving unit 303 receives the capability notification message, and the determining unit 301 determines, according to the capability notification message, that the terminal supports short TTI subframe transmission. Alternatively, the determining unit 301 determines, according to pre-stored information related to the terminal, that the terminal supports short TTI subframe transmission. A value of the length of the short TTI subframe may fall within 0 ms to 1 ms, for example, 0.5 ms or 0.8 ms. After it is determined that the terminal supports short TTI subframe transmission, the sending unit 302 delivers the DRX configuration information to the terminal according to short TTI subframe transmission supported by the terminal and by using radio resource control (RRC) signaling.

The DRX configuration information includes a timing length of an on-duration timer (onDurationTimer), a timing length of a DRX inactivity timer (drx-InactivityTimer), a timing length of a DRX retransmission timer (drx-RetransmissionTimer), a timing length of a hybrid automatic repeat request round trip time timer (HARQ RTT Timer), a short DRX cycle length, a long DRX cycle length, and a DRX start offset (drxStartOffset).

Both the short DRX cycle length and the long DRX cycle length use the length of the short TTI subframe as a parameter. Specific values of the cycle lengths are correspondingly the same as specific values of the short DRX cycle length and the long DRX cycle length when the short DRX cycle length and the long DRX cycle length use a length of a long TTI subframe as a parameter. The DRX start offset (drxStartOffset) is counted by using the short TTI subframe as a parameter.

The length of the long TTI subframe may be an existing standard TTI length, that is, the length of the long TTI subframe is 1 ms. Certainly, the length of the long TTI subframe may be another value less than 1 ms, and the length of the short TTI subframe is less than the length of the long TTI subframe.

In addition, a timing length of the on-duration timer, a timing length of the DRX inactivity timer, and a timing length of the DRX retransmission timer all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer still use a length of a long TTI subframe as a parameter, and the timing lengths do not change.

For example, either the long TTI or the short TTI is used, the timing length of the on-duration timer is 10 ms. Assuming that the length of the short TTI subframe is 0.5 ms, if the length of the short TTI subframe is used as a parameter, the timing length that is of the on-duration timer and that is configured in the RRC signaling is lengths of 20 short TTI subframes; or if the length of the long TTI subframe is used as a parameter, the timing length that is of the on-duration timer and that is configured in the RRC signaling is lengths of ten long TTI subframes.

The timing length of the hybrid automatic repeat request round trip time timer also uses the length of the short TTI subframe as a parameter. A quantity of short TTI subframes that are included in the hybrid automatic repeat request round trip time timer at the short TTI is the same as a quantity of long TTI subframes that are included in the hybrid automatic repeat request round trip time timer at the long TTI. That is, the timing length of the hybrid automatic repeat request round trip time timer changes in the two cases. For example, the length of the short TTI subframe is 0.5 ms, the timing length of the hybrid automatic repeat request round trip time timer is lengths of eight long TTI subframes (that is, 8 ms) at the long TTI, and the timing length of the hybrid automatic repeat request round trip time timer is lengths of eight short TTI subframes (that is, 4 ms) at the short TTI.

On the terminal side, the short TTI subframe is numbered according to the short TTI, and the length of the short TTI subframe is the same as the length of the short TTI, for example, 0.5 ms. After the terminal receives the DRX configuration information delivered by the base station, the terminal performs DRX according to the DRX configuration information delivered by the base station. For a specific process of performing DRX, refer to description in the foregoing embodiment. Details are not described herein again.

Figure 4:
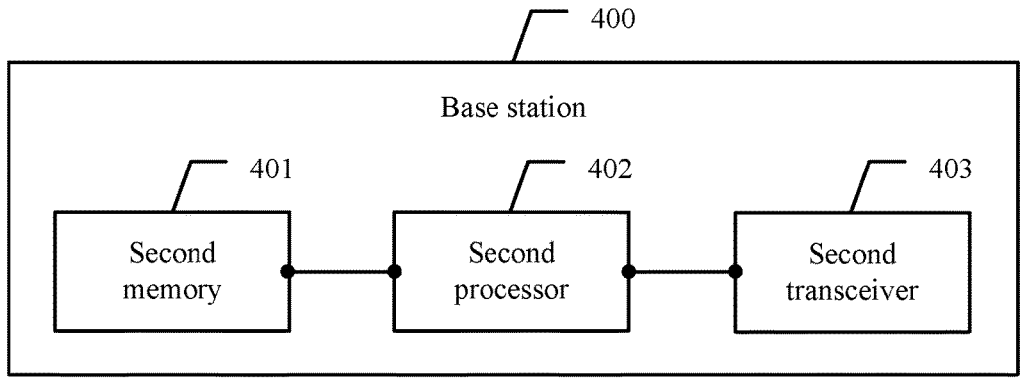
FIG. 4 is a schematic diagram of a base station according to another embodiment of the present disclosure.

Referring to FIG. 4, a base station in another embodiment of the present disclosure includes a second memory 401, a second processor 402, and a second transceiver 403. The second processor 402 invokes a software program stored in the second memory 401 to implement the following functions:

determining that a terminal supports short TTI subframe transmission, where a short TTI subframe is a subframe numbered according to a short TTI, and a length of the short TTI subframe is less than 1 ms; and controlling the second transceiver 403 to deliver DRX configuration information to the terminal according to the short TTI subframe transmission supported by the terminal.

Optionally, before determining that the terminal supports short TTI subframe transmission, the second processor 402 controls the second transceiver 403 to receive a capability notification message sent by the terminal. The capability notification message is used to notify the base station that the terminal supports the short TTI subframe transmission.

Optionally, the DRX configuration information includes: a timing length of a DRX-related timer, a short DRX cycle length, a long DRX cycle length, and a DRX start offset (drxStartOffset).

Optionally, the DRX-related timer includes:

an on-duration timer (onDurationTimer), a DRX inactivity timer (drx-InactivityTimer), a DRX retransmission timer (drx-RetransmissionTimer), and a hybrid automatic repeat request round trip time timer (HARQ RTT Timer).

Optionally, a timing length of the on-duration timer, a timing length of the DRX inactivity timer, and a timing length of the DRX retransmission timer that are in the DRX configuration information all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer that are in the DRX configuration information all use a length of the long TTI subframe as a parameter.

Optionally, a timing length of the hybrid automatic repeat request round trip time timer in the DRX configuration information uses the length of the short TTI subframe as a parameter, and a quantity of short TTI subframes that are included in the hybrid automatic repeat request round trip time timer at the short TTI is the same as a quantity of long TTI subframes that are included in the hybrid automatic repeat request round trip time timer at a long TTI.

Optionally, the length of the long TTI subframe is 1 ms, and the long TTI subframe is a subframe numbered according to the long TTI.

Figure 5:
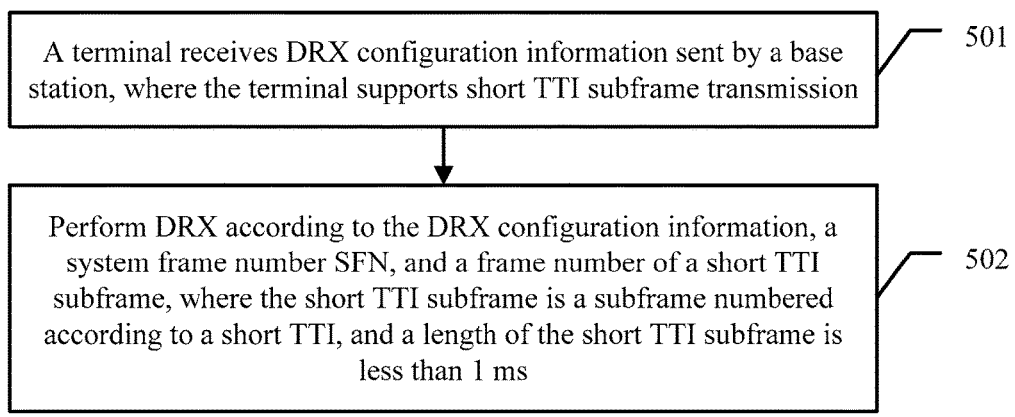
FIG. 5 is a schematic diagram of a DRX implementation method according to an embodiment of the present disclosure.

The following describes a DRX implementation method according to an embodiment of the present disclosure. Referring to FIG. 5, the method in this embodiment includes the following steps:

Step 501: Receive DRX configuration information sent by a base station, where a terminal supports short TTI subframe transmission.

Step 502: Perform DRX according to the DRX configuration information, a system frame number SFN, and a frame number of a short TTI subframe, where the short TTI subframe is a subframe numbered according to a short TTI, and a length of the short TTI subframe is less than 1 ms.

In addition, before step 501, the terminal may further send a capability notification message to the base station. The capability notification message is used to notify the base station that the terminal supports short TTI subframe transmission.

In specific implementation, when the terminal accesses a network, the terminal may send the capability notification message to the base station, and the base station determines, according to the notification message, that the terminal supports short TTI subframe transmission. Alternatively, the base station determines, according to pre-stored information related to the terminal, that the terminal supports short TTI subframe transmission. A value of the short TTI subframe may fall within 0 ms to 1 ms, for example, 0.5 ms or 0.8 ms. After determining that the terminal supports short TTI subframe transmission, the base station delivers the DRX configuration information to the terminal according to short TTI subframe transmission supported by the terminal and by using RRC signaling, and the terminal receives the DRX configuration information delivered by the base station.

The DRX configuration information includes a timing length of an on-duration timer (onDurationTimer), a timing length of a DRX inactivity timer (drx-InactivityTimer), a timing length of a DRX retransmission timer (drx-RetransmissionTimer), a timing length of a hybrid automatic repeat request round trip time timer (HARQ RTT Timer), a short DRX cycle length, a long DRX cycle length, and a DRX start offset (drxStartOffset).

Both the short DRX cycle length and the long DRX cycle length use the length of the short TTI subframe as a parameter. Specific values of the cycle lengths are correspondingly the same as specific values of the short DRX cycle length and the long DRX cycle length when the short DRX cycle length and the long DRX cycle length use a length of a long TTI subframe as a parameter. The DRX start offset (drxStartOffset) is counted by using the short TTI subframe as a parameter.

The length of the long TTI subframe may be an existing standard TTI length, that is, the length of the long TTI subframe is 1 ms. Certainly, the length of the long TTI subframe may be another value less than 1 ms, and the length of the short TTI subframe is less than the length of the long TTI subframe.

In addition, a timing length of the on-duration timer, a timing length of the DRX inactivity timer, and a timing length of the DRX retransmission timer all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer still use a length of a long TTI subframe as a parameter, and the timing lengths do not change.

For example, either the long TTI or the short TTI is used, the timing length of the on-duration timer is 10 ms. Assuming that the length of the short TTI subframe is 0.5 ms, if the length of the short TTI subframe is used as a parameter, the timing length that is of the on-duration timer and that is configured in the RRC signaling is lengths of 20 short TTI subframes; or if the length of the long TTI subframe is used as a parameter, the timing length that is of the on-duration timer and that is configured in the RRC signaling is lengths of ten long TTI subframes.

The timing length of the hybrid automatic repeat request round trip time timer also uses the length of the short TTI subframe as a parameter. A quantity of short TTI subframes that are included in the hybrid automatic repeat request round trip time timer at the short TTI is the same as a quantity of long TTI subframes that are included in the hybrid automatic repeat request round trip time timer at the long TTI. That is, the timing length of the hybrid automatic repeat request round trip time timer changes in the two cases. For example, the length of the short TTI subframe is 0.5 ms, the timing length of the hybrid automatic repeat request round trip time timer is lengths of eight long TTI subframes (that is, 8 ms) at the long TTI, and the timing length of the hybrid automatic repeat request round trip time timer is lengths of eight short TTI subframes (that is, 4 ms) at the short TTI.

On the terminal side, the short TTI subframe is also numbered according to the length of the short TTI, and the length of the short TTI subframe is the same as the length of the short TTI, for example, 0.5 ms. After the terminal receives the DRX configuration information delivered by the base station, the terminal performs DRX according to the DRX configuration information.

Specifically, a process in which the terminal performs DRX may be as follows:

When the short DRX cycle is used, if the frame number of the short TTI subframe (shortenSubframe) meets the following condition:

[(SFN*10)+Frame number of a short TTI subframe] mod (Short DRX cycle length)=(drxStartOffset) mod (Short DRX cycle length), the on-duration timer is enabled, and listening to a PDCCH starts. Herein, SFN is a system frame number, and the system frame number may be determined by the terminal according to a broadcast message and a blind detection result that are sent by the base station; and drxStartOffset is a DRX start offset, that is, a short TTI subframe in which the on-duration timer is enabled in DRX.

When the long DRX cycle is used, if the frame number of the short TTI subframe meets the following condition:

[(SFN*10)+Frame number of a short TTI subframe] mod (Long DRX cycle length)=drxStartOffset, the on-duration timer is enabled, and listening to a PDCCH starts.

In addition, when the frame number of the short TTI subframe meets the foregoing condition, and a moment is exactly an integer moment, the on-duration timer may be enabled, and listening to the PDCCH starts, so as to facilitate data collection of the terminal. For example, when the length of the short TTI subframe is 0.5 ms, the on-duration timer may be enabled when the frame number of the short TTI subframe meets the foregoing condition and the frame number is an even number. In this way, a start moment of the listening is exactly an integer moment (for example, at 1 ms or 2 ms).

When the on-duration timer is enabled, and the PDCCH is listened to, if the terminal receives control signaling for HARQ initial transmission, the DRX inactivity timer is enabled to delay a listening time. In addition, the HARQ RTT timer is enabled. Therefore, the terminal may not listen to the PDCCH before next retransmission. That is, the terminal does not listen to the PDCCH after the DRX inactivity timer expires and before the HARQ RTT timer expires. If data in a corresponding HARQ procedure is not successfully decoded after previous HARQ transmission (for example, the terminal feeds back a negative acknowledgement NACK), after the HARQ RTT timer expires, the terminal enables the DRX retransmission timer, and continues to listen to the PDCCH.

It can be learned from the foregoing process that the terminal listens to the PDCCH as long as any one of the on-duration timer, the DRX inactivity timer, or the DRX retransmission timer is enabled to run.

The method in this embodiment may further include other content described in the foregoing apparatus embodiments. For ease of description, details are not described herein again. For details, refer to the foregoing apparatus embodiments.

In this embodiment, a base station delivers DRX configuration information to a terminal according to short TTI subframe transmission supported by the terminal. The terminal receives the DRX configuration information delivered by the base station, and performs DRX according to the DRX configuration information delivered by the base station, a system frame number, and a frame number of a short TTI subframe. The snort TTI subframe is a subframe numbered according to a short TTI, and a length of the short TTI subframe is less than 1 ms. Therefore, this embodiment provides a solution of implementing DRX when a TTI is shortened, so as to improve overall performance of a system.

Figure 6:
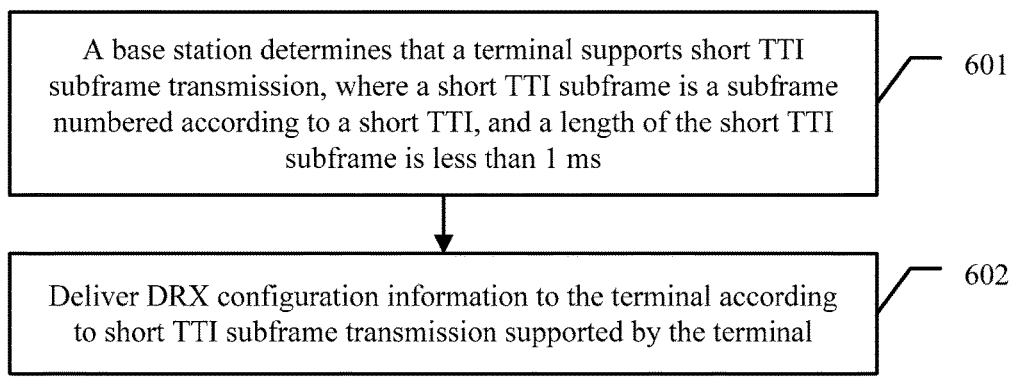
FIG. 6 is a schematic diagram of a DRX configuration method according to an embodiment of the present disclosure.

Referring to FIG. 6, the embodiments of the present disclosure provides an embodiment of a DRX configuration method, including the following steps.

601. Determine that a terminal supports short TTI subframe transmission, where a short TTI subframe is a subframe numbered according to a short TTI, and a length of the short TTI subframe is less than 1 ms.

602. Deliver DRX configuration information to the terminal according to the short TTI subframe transmission supported by the terminal.

In addition, before step 601, the base station may further receive a capability notification message sent by the terminal. The capability notification message is used to notify the base station that the terminal supports the short TTI subframe transmission.

In specific implementation, when the terminal accesses a network, the terminal may send the capability notification message to the base station. The base station receives the capability notification message, and the base station determines, according to the capability notification message, that the terminal supports short TTI subframe transmission. Alternatively, the base station determines, according to pre-stored information related to the terminal, that the terminal supports short TTI subframe transmission. A value of the length of the short TTI subframe may fall within 0 ms to 1 ms, for example, 0.5 ms or 0.8 ms. After it is determined that the terminal supports short TTI subframe transmission, the sending unit 302 delivers the DRX configuration information to the terminal according to short TTI subframe transmission supported by the terminal and by using radio resource control (RRC) signaling.

The DRX configuration information includes a timing length of an on-duration timer (onDurationTimer), a timing length of a DRX inactivity timer (drx-InactivityTimer), a timing length of a DRX retransmission timer (drx-RetransmissionTimer), a timing length of a hybrid automatic repeat request round trip time timer (HARQ RTT Timer), a short DRX cycle length, a long DRX cycle length, and a DRX start offset (drxStartOffset).

Both the short DRX cycle length and the long DRX cycle length use the length of the short TTI subframe as a parameter. Specific values of the cycle lengths are correspondingly the same as specific values of the short DRX cycle length and the long DRX cycle length when the short DRX cycle length and the long DRX cycle length use a length of a long TTI subframe as a parameter. The DRX start offset (drxStartOffset) is counted by using the short TTI subframe as a parameter.

The length of the long TTI subframe may be an existing standard TTI length, that is, the length of the long TTI subframe is 1 ms. Certainly, the length of the long TTI subframe may be another value less than 1 ms, and the length of the short TTI subframe is less than the length of the long TTI subframe.

In addition, a timing length of the on-duration timer, a timing length of the DRX inactivity timer, and a timing length of the DRX retransmission timer all use the length of the short TTI subframe as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter; or a timing length of the on-duration timer, a timing length of the DRX inactivity timer, and a timing length of the DRX retransmission timer still use a length of a long TTI subframe as a parameter, and the timing lengths do not change.

For example, either the long TTI or the short TTI is used, the timing length of the on-duration timer is 10 ms. Assuming that the length of the short TTI subframe is 0.5 ms, if the length of the short TTI subframe is used as a parameter, the timing length that is of the on-duration timer and that is configured in the RRC signaling is lengths of 20 short TTI subframes; or if the length of the long TTI subframe is used as a parameter, the timing length that is of the on-duration timer and that is configured in the RRC signaling is lengths of ten long TTI subframes.

The timing length of the hybrid automatic repeat request round trip time timer also uses the length of the short TTI subframe as a parameter. A quantity of short TTI subframes that are included in the hybrid automatic repeat request round trip time timer at the short TTI is the same as a quantity of long TTI subframes that are included in the hybrid automatic repeat request round trip time timer at the long TTI. That is, the timing length of the hybrid automatic repeat request round trip time timer changes in the two cases. For example, the length of the short TTI subframe is 0.5 ms, the timing length of the hybrid automatic repeat request round trip time timer is lengths of eight long TTI subframes (that is, 8 ms) at the long TTI, and the timing length of the hybrid automatic repeat request round trip time timer is lengths of eight short TTI subframes (that is, 4 ms) at the short TTI.

On the terminal side, the short TTI subframe is also numbered according to the length of the short TTI, and the length of the short TTI subframe is the same as the length of the short TTI, for example, 0.5 ms. After the terminal receives the DRX configuration information delivered by the base station, the terminal performs DRX according to the DRX configuration information delivered by the base station.

For ease of description, for a process that is not described in detail in this embodiment, refer to description in the foregoing corresponding apparatus embodiments.

In this embodiment, a base station determines that a terminal supports short TTI subframe transmission, and then, delivers DRX configuration information to the terminal according to short TTI subframe transmission supported by the terminal, so that the terminal performs DRX according to the DRX configuration information delivered by the base station, a system frame number, and a frame number of a short TTI subframe. The short TTI subframe is a subframe numbered according to a short TTI, and a length of the short TTI subframe is less than 1 ms. Therefore, this embodiment provides a solution of implementing DRX when a TTI is shortened, so as to improve overall performance of a system.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Erased on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium, that can store program code, such as a USB flash drive, a removable hard disk, a read-only memory (ROM), a random, access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A terminal, comprising:
a receiver configured to receive discontinuous reception (DRX) configuration information sent by a base station, wherein the terminal supports subframe transmission using a short transmission time interval (TTI); and
a processor configured to perform DRX according to the DRX configuration information, a system frame number (SFN), and a frame number of a short TTI subframe, wherein the short TTI subframe is a subframe numbered according to the short TTI, and wherein the short TTI subframe is less than 1 millisecond (ms) long.

2. The terminal according to claim 1, wherein the terminal further comprises a transmitter configured to send, before the receiver receives the DRX configuration information sent by the base station, a capability notification message to the base station for notifying the base station that the terminal supports subframe transmission using the short TTI such that the terminal transmits one subframe in less than 1 ms.

3. The terminal according to claim 1, wherein the DRX configuration information comprises a timing length of a DRX-related timer, a short DRX cycle length, a long DRX cycle length, and a DRX start offset.

4. The terminal according to claim 3, wherein the DRX-related timer comprises an on-duration timer, a DRX inactivity timer, a DRX retransmission timer, and a hybrid automatic repeat request (HARQ) round trip time (RTT) timer.

5. The terminal according to claim 4, wherein a timing length of the on-duration timer, a timing length of the DRX inactivity timer, and a timing length of the DRX retransmission timer that are in the DRX configuration information all use the 1 ms length of the short TTI subframe as a parameter, and wherein specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter, or
wherein a timing length of the on-duration timer, a timing length of the DRX inactivity timer, and a timing length of the DRX retransmission timer that are in the DRX configuration information all use a length of the long TTI subframe as a parameter.

6. The terminal according to claim 4, wherein a timing length of the HARQ RTT timer in the DRX configuration information uses the 1 ms length of the short TTI subframe as a parameter, and a quantity of short TTI subframes that are comprised in the HARQ RTT timer at the short TTI is the same as a quantity of long TTI subframes that are comprised in the HARQ RTT timer at a long TTI.

7. The terminal according to claim 5, wherein the length of the long TTI subframe is 1 ms, wherein the long TTI subframe is a subframe numbered according to the long TTI, and wherein a length of the short TTI is between 0.5 ms and 0.8 ms.

8. A base station, comprising:
a processor configured to determine that a terminal supports using a short transmission time interval (TTI) for subframe transmission such that the terminal transmits a subframe in less than 1 millisecond (ms), wherein the subframe is numbered according to the short TTI, and wherein a length of the short TTI is less than 1 ms; and
a transmitter configured to deliver discontinuous reception (DRX) configuration information to the terminal according to the short TTI used for subframe transmission by the terminal.

9. The base station according to claim 8, wherein the base station further comprises a receiver configured such that before the processor determines that the terminal supports using the short TTI for subframe transmission, the receiver receives a capability notification message sent by the terminal for notifying the base station that the terminal supports using the short TTI for subframe transmission.

10. The base station according to claim 8, wherein the DRX configuration information comprises a timing length of a DRX-related timer, a short DRX cycle length, a long DRX cycle length, and a DRX start offset.

11. The base station according to claim 10, wherein the DRX-related timer comprises an on-duration timer, a DRX inactivity timer, a DRX retransmission timer, and a hybrid automatic repeat request (HARQ) round trip time (RTT) timer.

12. The base station according to claim 11, wherein a timing length of the on-duration timer, a timing length of the DRX inactivity timer, and a timing length of the DRX retransmission timer that are in the DRX configuration information all use the length of the short TTI as a parameter, and specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter, or wherein a timing length of the on-duration timer, a timing length of the DRX inactivity timer, and a timing length of the DRX retransmission timer that are in the DRX configuration information all use a length of the long TTI subframe as a parameter.

13. The base station according to claim 11, wherein a timing length of the HARQ RTT timer in the DRX configuration information uses the length of the short TTI as a parameter, and a quantity of short TTI subframes that are comprised in the HARQ RTT timer at the short TTI is the same as a quantity of long TTI subframes that are comprised in the HARQ RTT timer at a long TTI.

14. The base station according to claim 12, wherein the length of the long TTI subframe is 1 ms, and wherein the long TTI subframe is a subframe numbered according to the long TTI.

15. A discontinuous reception (DRX) implementation method, comprising:

receiving, by a terminal, DRX configuration information sent by a base station, wherein the terminal supports subframe transmission using a short transmission time interval (TTI); and performing DRX according to the DRX configuration information, a system frame number (SFN), and a frame number of a short TTI subframe, wherein the short TTI subframe is a subframe numbered according to the short TTI, and wherein the short TTI subframe is less than 1 millisecond (ms) long.

16. The method according to claim 15, wherein before receiving DRX configuration information sent by a base station, the method further comprises sending a capability notification message to the base station for notifying the base station that the terminal supports subframe transmission using the short TTI such that the terminal transmits one subframe in less than 1 ms.

17. The method according to claim 15, wherein the DRX configuration information comprises a timing length of a DRX-related timer, a short DRX cycle length, a long DRX cycle length, and a DRX start offset.

18. The method according to claim 17, wherein the DRX-related timer comprises an on-duration timer, a DRX inactivity timer, a DRX retransmission timer, and a hybrid automatic repeat request (HARQ) round trip time (RTT).

19. The method according to claim 18, wherein a timing length of the on-duration timer, a timing length of the DRX inactivity timer, and a timing length of the DRX retransmission timer that are in the DRX configuration information all use the 1 ms length of the short TTI subframe as a parameter, and wherein specific values of the timing lengths are correspondingly the same as specific values of the timing length of the on-duration timer, the timing length of the DRX inactivity timer, and the timing length of the DRX retransmission timer when the timing length of the on-duration timer, the timing length of the DRX inactivity timer, and the timing length of the DRX retransmission timer use a length of a long TTI subframe as a parameter, or wherein a timing length of the on-duration timer, a timing length of the DRX inactivity timer, and a timing length of the DRX retransmission timer that are in the DRX configuration information all use a length of the long TTI subframe as a parameter.

20. The method according to claim 15, wherein a timing length of a hybrid automatic repeat request (HARQ) round trip time (RTT) timer in the DRX configuration information uses the 1 ms length of the short TTI subframe as a parameter, and a quantity of short TTI subframes that are comprised in the HARQ RTT timer at the short TTI is the same as a quantity of long TTI subframes that are comprised in the HARQ RTT timer at a long TTI.

* * * * *